US012589999B2

(12) United States Patent
Liu et al.

(10) Patent No.: US 12,589,999 B2
(45) Date of Patent: Mar. 31, 2026

(54) LITHIUM MANGANESE IRON PHOSPHATE POSITIVE ELECTRODE ACTIVE MATERIAL AND PREPARATION METHOD, POSITIVE ELECTRODE PLATE, SECONDARY BATTERY AND ELECTRICAL APPARATUS THEREOF

(71) Applicant: CONTEMPORARY AMPEREX TECHNOLOGY (HONG KONG) LIMITED, Hong Kong (CN)

(72) Inventors: Shaojun Liu, Ningde (CN); Wenwei Zhan, Ningde (CN); Xinxin Zhang, Ningde (CN); Chuying Ouyang, Ningde (CN); Qingzheng Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 416 days.

(21) Appl. No.: 18/474,567

(22) Filed: Sep. 26, 2023

(65) Prior Publication Data

US 2024/0018001 A1     Jan. 18, 2024

Related U.S. Application Data

(63) Continuation of application No. PCT/CN2022/106079, filed on Jul. 15, 2022.

(51) Int. Cl.
*C01B 25/30* (2006.01)
*H01M 10/052* (2010.01)

(52) U.S. Cl.
CPC ........... *C01B 25/30* (2013.01); *H01M 10/052* (2013.01); *C01P 2004/03* (2013.01);
(Continued)

(58) Field of Classification Search
CPC .................................................. H01M 10/052
See application file for complete search history.

(56) References Cited

FOREIGN PATENT DOCUMENTS

| CN | 101997118 A | 3/2011 |
| CN | 102992294 A | 3/2013 |
| | (Continued) | |

OTHER PUBLICATIONS

CN114649517Atranslation (Year: 2022).*
(Continued)

*Primary Examiner* — Brian R Ohara
(74) *Attorney, Agent, or Firm* — Ladas & Parry LLP

(57) ABSTRACT

A lithium manganese iron phosphate positive electrode active material, preparation method, a positive electrode plate, a secondary battery and an electrical apparatus are disclosed. The method comprises: mixing and grinding an iron source, a solid base and optionally a source of doping element M After grinding, impurities are removed to obtain a nanoscale iron-containing oxide; mixing the obtained nanoscale iron-containing oxide with a solvent, a lithium source, a manganese source, a phosphorus source, optionally a source of doping element N, optionally a source of doping element Q and optionally a source of doping element R in a predetermined ratio and then grinding. After grinding, granulating to obtain a powder; and sintering the powder to obtain the lithium manganese iron phosphate positive electrode active material. A lithium manganese iron phosphate positive electrode active material having both good electrochemical performance and high tap density can be obtained.

15 Claims, 3 Drawing Sheets

(52) U.S. Cl.
    CPC ....... *C01P 2004/62* (2013.01); *C01P 2006/11* (2013.01); *C01P 2006/40* (2013.01)

(56)                References Cited

FOREIGN PATENT DOCUMENTS

| CN | 103078098 A | 5/2013 |
|----|-------------|--------|
| CN | 105329867 A | 2/2016 |
| CN | 109250698 A | 1/2019 |
| CN | 104167549 B | 7/2019 |
| CN | 110970618 A | 4/2020 |
| CN | 111916715 A | 11/2020 |
| CN | 113148969 A | 7/2021 |
| CN | 113929073 A | 1/2022 |
| CN | 114380280 A | 4/2022 |
| CN | 114644328 A | 6/2022 |
| CN | 114649517 A | 6/2022 |
| JP | 2009295566 A | 12/2009 |
| WO | 2008018633 A1 | 2/2008 |

OTHER PUBLICATIONS

Japan Office Action for Application No. 2024-504524, mailed Mar. 25, 2025, 5 pages.

ISR for International Application PCT/CN2022/106079 mailed Nov. 25, 2022.

Decision to Grant a Patent dated Sep. 2, 2025 for application JP 2024-504524.

Notice of Grant dated Nov. 10, 2025 for application CN 202280003253. 7.

Extended European Search Report dated Dec. 19, 2025 for application EP 22950739.7.

* cited by examiner

LITHIUM MANGANESE IRON PHOSPHATE POSITIVE ELECTRODE ACTIVE MATERIAL AND PREPARATION METHOD, POSITIVE ELECTRODE PLATE, SECONDARY BATTERY AND ELECTRICAL APPARATUS THEREOF

CROSS-REFERENCE TO RELATED APPLICATIONS

This application is a continuation of International application PCT/CN2022/106079 filed on Jul. 15, 2022, the subject matter of which is incorporated by reference herein in its entirety.

TECHNICAL FIELD

The present application falls within the technical field of batteries, and specifically relates to a lithium manganese iron phosphate positive electrode active material and a preparation method, a positive electrode plate, a secondary battery and an electrical apparatus thereof.

BACKGROUND ART

In recent years, secondary batteries have been widely used in energy storage power systems such as hydropower, fire-power, wind power and solar power stations, as well as electric tools, electric bicycles, electric motorcycles, electric vehicles, military equipment, aerospace and other fields. With the application and popularization of secondary batteries, their safety performance has attracted more and more attention. Lithium manganese iron phosphate positive electrode active material has become one of the most concerned positive electrode active materials because of its high capacity, good safety performance and abundant raw material sources. However, it is difficult for the currently prepared lithium manganese iron phosphate positive electrode material to give the secondary battery both good electrochemical performance and high energy density.

SUMMARY OF THE INVENTION

An object of the present application is to provide a Lithium manganese iron phosphate positive electrode active material and a preparation method, a positive electrode plate, a secondary battery and an electrical apparatus thereof, so that a lithium manganese iron phosphate positive electrode active material having both good electrochemical performance and high tap density can be obtained, thereby enabling the secondary battery to have both good electrochemical performance and high energy density.

A first aspect of the present application provides a method for preparing a lithium manganese iron phosphate positive electrode active material, comprising the steps of:

S1. Preparation of nanoscale iron-containing oxide by low temperature solid phase reaction method:

Mixing and grinding an iron source, a solid base and optionally a source of doping element M to allow the components to undergo a low temperature solid phase reaction, and after grinding, removing impurities by washing, and drying the obtained product to obtain a nanoscale iron-containing oxide, wherein the doping element M denotes a doping element of manganese site and iron site, and optionally comprises at least one of Al, Cu, Mg, Zn, Ni, Ti, V, Zr, Co, Ga, Sn, Sb, Nb and Ge;

S2. Granulation by spray drying:

Mixing the nanoscale iron-containing oxide obtained in S1 with a solvent, a lithium source, a manganese source, a phosphorus source, optionally a source of doping element N, optionally a source of doping element Q and optionally a source of doping element R in a predetermined ratio and then grinding, and after grinding, granulating by spray drying to obtain a powder, wherein the doping element N denotes a doping element of lithium site, and optionally comprises at least one of Zn, Al, Na, K, Mg, Nb, Mo and W; the doping element Q denotes a doping element of phosphorus site, and optionally comprises at least one of B, S, Si and N; and the doping element R denotes a doping element of oxygen site, and optionally comprises at least one of S, F, Cl and Br;

S3. Sintering:

Sintering the powder obtained in S2 to obtain the lithium manganese iron phosphate positive electrode active material.

In embodiments of the present application, the molar ratio of the iron source to the solid base in S1 is $1:(1\sim3)$.

In embodiments of the present application, the time of the mixing and grinding in S1 is 20 min~60 min.

In embodiments of the present application, the process of the removing impurities by washing in S1 comprises water washing and alcohol washing.

In embodiments of the present application, the drying in S1 is vacuum drying.

In embodiments of the present application, the drying temperature in S1 is below 100° C.

In embodiments of the present application, the drying time in S1 is 2 h~15 h.

In embodiments of the present application, in S1, the mixing and grinding are conducted in a mortar or a ball milling tank, optionally the grinding speed of the mortar is 100 r/min; and optionally, the rotational speed of the ball milling is 300 r/min~800 r/min.

In embodiments of the present application, in S1, after mixing and grinding, a standing step is further included to complete the low temperature solid phase reaction. Optionally, the standing time is 30 min~120 min.

In embodiments of the present application, in S1, a surfactant is further added to be mixed and ground together with the iron source, the solid base and the source of doping element M to adjust the morphology of the obtained nanoscale iron-containing oxide. Optionally, the surfactant comprises polyethylene glycol; and optionally, the surfactant is added in an amount below 5% by weight, based on the total weight of the iron source, the solid base and the source of doping element M.

In embodiments of the present application, in S1, before mixing and grinding the iron source, the solid base and the source of doping element M to allow the components to undergo the low temperature solid phase reaction, a step is further included: separately grinding the iron source, the solid base and the source of doping element M so as to allow the low temperature solid phase reaction to proceed sufficiently and is in favour of obtaining a nanoscale iron-containing oxide with controllable morphology and size. Optionally, the grinding time of the iron source is 30 min~90 min; optionally, the grinding time of the solid base is 30 min~90 min; and optionally, the grinding time of the source of doping element M is 30 min~90 min.

In embodiments of the present application, the iron source in S1 is a trivalent iron salt, and optionally comprises at least one of ferric chloride, ferric nitrate and ferric sulfate.

In embodiments of the present application, the solid base in Si comprises at least one of sodium hydroxide, potassium hydroxide, sodium carbonate and potassium carbonate, and optionally comprises sodium hydroxide.

In embodiments of the present application, the source of doping element M in Si comprises at least one of hydrochloride, nitrate, sulfate and acetate of the doping element M.

In embodiments of the present application, the grinding in S2 is conducted in a ball milling tank. Optionally, the rotational speed of the ball milling is 300 r/min~800 r/min; and optionally, the ball milling time is 3 h~24 h.

In embodiments of the present application, the spray drying temperature in S2 is 200° C.~250° C.

In embodiments of the present application, the solvent in S2 comprises ethanol, water or a mixed solvent thereof.

In embodiments of the present application, the lithium source in S2 comprises at least one of $Li_2CO_3$, LiOH, $Li_3PO_4$ and $LiH_2PO_4$.

In embodiments of the present application, the manganese source in S2 comprises at least one of $MnCO_3$, $Mn(CH_3COO)_2$ and $MnC_2O_4$.

In embodiments of the present application, the phosphorus source in S2 comprises at least one of $(NH_4)_2HPO_4$, $NH_4H_2PO_4$, $(NH_4)_3PO_4$ and $H_3PO_4$.

In embodiments of the present application, the source of doping element N in S2 comprises at least one of hydrochloride, nitrate, sulfate and acetate of the doping element N.

In embodiments of the present application, the source of doping element Q in S2 comprises at least one of sulfate, borate, nitrate and silicate of the doping element Q.

In embodiments of the present application, the source of doping element R in S2 comprises at least one of elementary substance and ammonium salt of the doping element R.

By selecting the sources of the above-mentioned doping elements, the uniformity of the distribution of the above-mentioned doping elements can be improved, thereby improving the electrochemical performance of the lithium manganese iron phosphate positive electrode active material.

In embodiments of the present application, a carbon source is further added in S2, and mixed and ground together to obtain a carbon-coated lithium manganese iron phosphate positive electrode active material. Optionally, the carbon source comprises at least one of an organic carbon source and an inorganic carbon source, and more optionally comprises at least one of glucose, sucrose, starch, fructose, polyvinyl alcohol, polyethylene glycol and citric acid.

In embodiments of the present application, the sintering process in S3 comprises the steps of: S31, pre-sintering the powder obtained in S2 at a low temperature of 350° C.~550° C. under an air atmosphere or a protective gas atmosphere, and obtaining a pre-sintered material after the reaction; S32, grinding the pre-sintered material obtained in S31, and then granulating by spray drying to obtain a pre-sintered material powder; and S33, sintering the pre-sintered material powder obtained in S32 at a high temperature of 650° C.~750° C. under a protective gas atmosphere to obtain the lithium manganese iron phosphate positive electrode active material.

In embodiments of the present application, the low temperature pre-sintering time in S31 is 2 h~10 h.

In embodiments of the present application, the high temperature sintering time in S33 is 2 h~10 h.

In embodiments of the present application, the grinding in S32 is conducted in a ball milling tank. Optionally, the rotational speed of the ball milling is 300 r/min~800 r/min; and optionally, the ball milling time is 3 h~24 h.

In embodiments of the present application, the preparation method further comprises the step of crushing the lithium manganese iron phosphate positive electrode active material obtained in S3 to a desired particle diameter, and optionally, the crushing is airflow crushing.

A second aspect of the present application provides a lithium manganese iron phosphate positive electrode active material obtained by the preparation method of the first aspect of the present application, having a chemical formula of $Li_aN_bFe_xMn_yM_{1-x-y}P_{1-m}Q_mO_{4-n}R_n$, wherein the doping element M denotes a doping element of manganese site and iron site, and optionally comprises at least one of Al, Cu, Mg, Zn, Ni, Ti, V, Zr, Co, Ga, Sn, Sb, Nb and Ge; the doping element N denotes a doping element of lithium site, and optionally comprises at least one of Zn, Al, Na, K, Mg, Nb, Mo and W; the doping element Q denotes a doping element of phosphorus site, and optionally comprises at least one of B, S, Si and N; and the doping element R denotes a doping element of oxygen site, and optionally comprises at least one of S, F, Cl and Br, wherein a is 0.9 to 1.1, b is 0 to 0.1, and optionally 0.001 to 0.1; x is 0.001 to 0.999, and optionally 0.199 to 0.50; y is 0.001 to 0.999, and optionally 0.499 to 0.80; 1-x-y is 0 to 0.1, and optionally 0.001 to 0.1; m is 0 to 0.1, and optionally 0.001 to 0.1; n is 0 to 0.1, and optionally 0.001 to 0.1; and the lithium manganese iron phosphate positive electrode active material is electrically neutral, with a tap density of above 1.4 $g/cm^3$, and optionally 1.47 $g/cm^3$~1.82 $g/cm^3$. Thus, the volumetric energy density of the secondary battery can be improved.

In embodiments of the present application, the volume average particle diameter Dv50 of the lithium manganese iron phosphate positive electrode active material is 300 nm~500 nm. Thus, the electrochemical performance of the secondary battery can be improved.

In embodiments of the present application, the lithium manganese iron phosphate positive electrode active material has a spherical or spheroidal single crystal morphology. Thus, the electrochemical performance and volumetric energy density of the secondary battery can be improved.

A third aspect of the present application provides a positive electrode plate comprising a positive electrode current collector and a positive electrode film layer provided on at least one surface of the positive electrode current collector, wherein the positive electrode film layer comprises the lithium manganese iron phosphate positive electrode active material obtained by the preparation method of the first aspect of the present application or the lithium manganese iron phosphate positive electrode active material of the second aspect of the present application.

In embodiments of the present application, the content of the lithium manganese iron phosphate positive electrode active material in the positive electrode film layer is more than 50% by weight, optionally 90% to 99% by weight, based on the total weight of the positive electrode film layer.

A fourth aspect of the present application provides a secondary battery comprising the lithium manganese iron phosphate positive electrode active material obtained by the preparation method of the first aspect of the present application or the lithium manganese iron phosphate positive electrode active material of the second aspect of the present application or the positive electrode plate of the third aspect of the present application.

A fifth aspect of the present application provides an electrical apparatus comprising the secondary battery of the fourth aspect of the present application.

Beneficial Effects

The method for preparing a lithium manganese iron phosphate positive electrode active material provided by the present application has a simple process, low energy consumption and low production cost, and a nanoscale lithium manganese iron phosphate positive electrode active material having both good electrochemical performance and high tap density can be obtained, for example, the tap density is above 1.4 g/cm³, and the initial gram capacity is above 138 mAh/g, which is much higher than that of a nanoscale lithium manganese iron phosphate positive electrode active material obtained by a traditional high temperature solid state sintering method, so that a secondary battery having both good electrochemical performance and high volumetric energy density can be obtained after applying the lithium manganese iron phosphate positive electrode active material obtained by the preparation method of the present application to the secondary battery. The electrical apparatus of the present application comprises the secondary battery of the present application, and thus has at least the same advantages as the secondary battery.

DESCRIPTION OF DRAWINGS

In order to more clearly illustrate the technical solutions of the Examples of the present application, the drawings to be used in the Examples of the present application will be briefly introduced below. Apparently, the drawings described below are merely some embodiments of the present application. For those of ordinary skills in the art, other drawings may also be obtained based on these drawings without making creative work.

Figure 1:
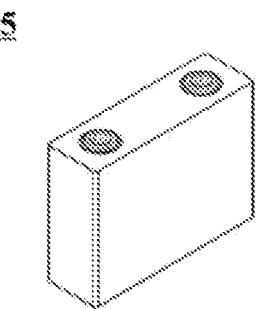
FIG. 1 is a schematic view of an embodiment of a secondary battery of the present application.

In the accompanying drawings, the accompanying drawings are not necessarily drawn to actual scale. Reference numerals are illustrated as follows: 1 Battery pack; 2 Upper box body; 3 Lower box body; 4 Battery module; 5 Secondary battery; 51 Case; 52 Electrode assembly; and 53 Cover plate.

DETAILED DESCRIPTION

Hereinafter, embodiments that specifically disclose a lithium manganese iron phosphate positive electrode active material and a preparation method, a positive electrode plate, a secondary battery, and an electrical apparatus thereof of the present application are described in detail with reference to the drawings as appropriate. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if ranges of 60-120 and are listed for a particular parameter, it is understood that ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2- 3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of the combination of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specifically stated, all embodiments and optional embodiments of the present application may be combined with each other to form new technical solutions, and such technical solutions should be considered as being included in the disclosure of the present application.

Unless otherwise specifically stated, all technical features and optional technical features of the present application may be combined with each other to form new technical solutions, and such technical solutions should be considered as being included in the disclosure of the present application.

If not specifically stated, all steps of the present application may be performed sequentially or randomly, preferably sequentially. For example, the method comprises steps S1 and S2, meaning that the method may comprise steps S1 and S2 performed sequentially, or may comprise steps S2 and S1 performed sequentially. For example, the reference to the method may further comprise step S3, meaning that step S3 may be added to the method in any order. For example, the method may comprise steps S1, S2 and S3, or may also comprise steps S1, S3 and S2, or may also comprise steps S3, S1 and S2, and the like.

Unless otherwise specifically stated, the "including" and "comprising" mentioned in the present application mean open-ended, or may be closed-ended. For example, the "including" and "comprising" may indicate that it is possible to include or comprise other components not listed, and it is also possible to include or comprise the only listed components.

Unless otherwise specified, the term "or" is inclusive in the present application. By way of example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

In the present application, the terms "plurality" and "a plurality" refer to two or more than two.

At present, the method for preparing lithium manganese iron phosphate positive electrode active material is mainly a high temperature solid phase sintering method, wherein a precursor is obtained by mixing various raw materials, and then a lithium manganese iron phosphate positive electrode active material is obtained through a high temperature sintering process. However, the morphology and size of the lithium manganese iron phosphate positive electrode active materials prepared by the prior art are difficult to control, and most of them are micro-nano particles, thereby affecting the electrochemical performance thereof.

Nanocrystallization of the obtained lithium manganese iron phosphate positive electrode active materials by high-speed ball milling can reduce polarization, shorten lithi-umion transport distance and improve electrochemical performance. However, nanocrystallization will significantly increase the specific surface area of the lithium manganese iron phosphate positive electrode active material, resulting in a significant decrease in its tap density, and in turn leading to a lower volumetric energy density of the secondary battery, which cannot meet the requirements of high energy density secondary batteries.

Therefore, it is difficult for the lithium manganese iron phosphate positive electrode active material obtained by the traditional high temperature solid phase sintering method to have both good electrochemical performance and high tap density.

During the research process, the inventors of the present application have surprisingly found that by preparing a nanoscale iron-containing oxide by a low temperature solid phase reaction method in advance, followed by a granulation process by spray drying and a sintering process, a nanoscale lithium manganese iron phosphate positive electrode active material having both good electrochemical performance and high tap density can be obtained.

Preparation Method

Specifically, a first aspect of an embodiment of the present application provides a method for preparing a lithium manganese iron phosphate positive electrode active material, comprising the following steps S1, S2 and S3.

S1. Preparation of Nanoscale Iron-Containing Oxide by Low Temperature Solid Phase Reaction Method.

Mixing and grinding an iron source, a solid base and optionally a source of doping element M to allow the components to undergo a low temperature solid phase reaction, and after grinding, removing impurities by washing, and drying the obtained product to obtain a nanoscale iron-containing oxide, wherein the doping element M denotes a doping element of manganese site and iron site.

S2. Granulation by Spray Drying.

Mixing the nanoscale iron-containing oxide obtained in S1 with a solvent, a lithium source, a manganese source, a phosphorus source, optionally a source of doping element N, optionally a source of doping element Q and optionally a source of doping element R in a predetermined ratio and then grinding, and after grinding, granulating by spray drying to obtain a powder, wherein the doping element N denotes a doping element of lithium site, the doping element Q denotes a doping element of phosphorus site, and the doping element R denotes a doping element of oxygen site.

S3. Sintering.

Sintering the powder obtained in S2 to obtain the lithium manganese iron phosphate positive electrode active material.

When preparing the lithium manganese iron phosphate positive electrode active material, the present application uses the nanoscale iron-containing oxide as a raw material, which is different from the iron-containing oxide prepared by the traditional high temperature solid phase reaction method. In the present application, the nanoscale iron-containing oxide is prepared by a low temperature solid phase reaction method without high temperature sintering treatment, only the iron source, the solid base and optionally the source of doping element M need to be mixed and ground at a lower temperature, so that the various raw material components can react chemically in a shorter time, and the iron-containing oxide is synthesized by a one step method. Moreover, the morphology and size of the iron-containing oxide obtained by the low temperature solid phase reaction method of the present application are controllable, the particle size is in the nanometer level, and at the same time, the obtained iron-containing oxide has high purity and less impurities, with a reaction conversion rate of 100%.

When preparing the lithium manganese iron phosphate positive electrode active material, the present application uses the nanoscale iron-containing oxide as a raw material, and compared with using ferrous oxalate or ferric phosphate as the raw material, the preparation method of the present application can effectively control the morphology and size of the obtained lithium manganese iron phosphate positive electrode active material, the particle morphology is more regular, the particle size is in the nanometer level, and the particle size distribution is more uniform, thus enabling a good electrochemical performance; meanwhile, the obtained lithium manganese iron phosphate positive electrode active material also has high tap density, so that the volumetric energy density of the secondary battery can be improved; and in addition, the obtained lithium manganese iron phosphate positive electrode active material also has the advantages of high purity and high batch stability.

In addition, the traditional high temperature solid phase sintering method mostly uses high speed ball milling to fine the morphology and size of various raw materials (such as iron source, manganese source, phosphorus source, lithium source, etc.) used in the preparation of lithium manganese iron phosphate positive electrode active material, with an expectation to achieve uniform distribution of various elements (such as lithium element, manganese element, iron element, etc.); however, the effect obtained is not so good that the electrochemical performances of the lithium manganese iron phosphate positive electrode active material and secondary battery are affected. At the same time, the use of high speed ball milling process will also increase energy consumption and production cost. When preparing the lithium manganese iron phosphate positive electrode active material, the present application uses the nanoscale iron-containing oxide as a raw material, so that a lithium manganese iron phosphate positive electrode active material with lithium element, manganese element, iron element and various doping elements uniformly mixed at the molecular level can also be obtained, thus avoiding the problems of large raw material particles, uneven distribution of various elements and high energy consumption when prepared by traditional high temperature solid phase sintering method.

When preparing the lithium manganese iron phosphate positive electrode active material, the present application can also precisely control the ratios of iron element and manganese element, so that the obtained lithium manganese iron phosphate positive electrode active material has few crystal defects, for example, few cationic antisite defects (such as Li/Mn antisite defects), and the ratio of Li/Mn antisite defects is <0.2%, which is in favour of lithium ion transport and achieving high-rate charging. A crystal defect refers to the position where the internal structural integrity of the crystal is destroyed, and the Li/Mn antisite defect refers to the exchange of the positions of $Li^+$ and $Mn^+$ in the lattice of lithium manganese iron phosphate. The Li/Mn antisite defect ratio refers to the percentage of $Li^+$ exchanged with $Mn^{2+}$ in the total amount of $Li^+$ in the lithium manganese iron phosphate positive electrode active material. Since the $Li^+$ transport channel is a one-dimensional channel, it is difficult for $Mn^{2+}$ to migrate in the $Li^+$ transport channel, thus the antisite defective $Mn^{2+}$ will hinder the transport of $Li^+$ In the present application, the Li/Mn antisite defect ratio can be determined by X-ray diffraction (XRD) method according to JIS K 0131-1996. For example, the XRD results of the test sample of lithium manganese iron phosphate positive electrode active material are compared with the PDF (Powder Diffraction File) card of a standard crystal, so as to obtain the Li/Mn antisite defect ratio.

Therefore, the preparation method provided by the present application has a simple process, low energy consumption and low production cost, and a nanoscale lithium manganese iron phosphate positive electrode active material having both good electrochemical performance and high tap density can be obtained, for example, the tap density is above 1.4 $g/cm^3$, and the initial gram capacity is above 138 mAh/g, which is much higher than that of a nanoscale lithium manganese iron phosphate positive electrode active material obtained by a traditional high temperature solid state sintering method, so that a secondary battery having both good electrochemical performance and high volumetric energy density can be obtained when applying the lithium manganese iron phosphate positive electrode active material obtained by the preparation method of the present application to the secondary battery.

In some embodiments, in S1, the iron source is a trivalent iron salt, optionally comprising at least one of ferric chloride, ferric nitrate, and ferric sulfate, and the source of doping element M comprises at least one of hydrochloride, nitrate, sulfate and acetate of the doping element M. Therefore, in the present application, the nanoscale iron-containing oxide can be ferric oxide ($Fe_2O_3$) or a solid solution of ferric oxide ($Fe_2O_3$) with an oxide of the doping element M.

In some embodiments, in S1, the solid base comprises at least one of sodium hydroxide, potassium hydroxide, sodium carbonate and potassium carbonate, optionally sodium hydroxide.

In some embodiments, the molar ratio of the iron source to the solid base in S1 is 1:(1~3).

In the process of mixing and grinding the iron source, the solid base and optionally the source of doping element M, they first react to form an iron hydroxide doped or undoped with the doping element M, and then the iron hydroxide doped or undoped with the doping element M will rapidly transformed by the action of the solid base into a nanoscale iron-containing oxide, such as ferric oxide, or a solid solution of ferric oxide with an oxide of the doping element M. In the process of low temperature solid phase reaction, the melting point (or decomposition temperature) of the iron hydroxide doped or undoped with the doping element M is low, so that the nanoscale iron-containing oxide will be rapidly generated by the action of the solid base. In the process of mixing and grinding, the reaction raw materials are first transformed from solid to slurry, and then from slurry to powder. There is no grainy feeling during the grinding process, and the obtained iron-containing oxide particles are fine, having a size of nanoscale, for example, between 100 nm to 800 nm.

The doping element M denotes a doping element of manganese site and iron site. In some embodiments, optionally the doping element M comprises at least one of Al, Cu, Mg, Zn, Ni, Ti, V, Zr, Co, Ga, Sn, Sb, Nb and Ge. More optionally, the doping element M comprises at least one of Al, Cu, Mg, Zn and Ni.

In some embodiments, the mixing and grinding in S1 can be carried out by means of suitable grinding methods known in the art, for example, the mixing and grinding can be carried out in a mortar or a ball mill tank. Optionally, the grinding speed of the mortar is 100 r/min. Optionally, the rotational speed of the ball milling is 300 r/min~800 r/min.

In some embodiments, the time of the mixing and grinding in S1 is 20 min~60 min.

In some embodiments, in S1, after mixing and grinding, a standing step is further included to complete the low temperature solid phase reaction. Optionally, the standing time is 30 min~120 min.

In some embodiments, in S1, the sum of the time of mixing and grinding and the standing time is longer than or equal to 90 min, thereby ensuring that the low temperature solid phase reaction is complete, and the obtained nanoscale iron-containing oxide has a higher purity.

In some embodiments, in S1, before mixing and grinding the iron source, the solid base and the source of doping element M to allow the components to undergo the low temperature solid phase reaction, a step is further included: separately grinding the iron source, the solid base and the source of doping element M so as to allow the low temperature solid phase reaction to proceed sufficiently and is in favour of obtaining a nanoscale iron-containing oxide with controllable morphology and size. Optionally, the grinding time of the iron source is 30 min~90 min. Optionally, the grinding time of the solid base is 30 min~90 min. Optionally, the grinding time of the source of doping element M is 30 min~90 min.

In some embodiments, in S1, a surfactant is further added to be mixed and ground together with the iron source, the solid base and the source of doping element M to adjust the morphology of the obtained nanoscale iron-containing oxide. Optionally, the surfactant comprises polyethylene glycol, for example, at least one of polyethylene glycol 200, polyethylene glycol 300, polyethylene glycol 400 and polyethylene glycol 600. Optionally, the surfactant is added in an amount below 5% by weight, based on the total weight of the iron source, the solid base and the source of doping element M.

In some embodiments, the process of the removing impurities by washing in S1 comprises water washing and alcohol washing, and optionally, the alcohol washing uses ethanol as a solvent. Optionally, the water washing is carried out 2~4 times, and the alcohol washing is carried out 2~4 times.

In some embodiments, the drying in S1 is vacuum drying.

In some embodiments, the drying temperature in S1 is below 100° C.

In some embodiments, the drying time in S1 is 2 h~15 h.

In some embodiments, in S2, the lithium source may be a lithium-containing compound known in the art for the preparation of lithium manganese iron phosphate positive electrode active material, for example, the lithium source comprises at least one of $Li_2CO_3$, LiOH, $Li_3PO_4$ and $LiH_2PO_4$.

In some embodiments, in S2, the manganese source may be a manganese-containing compound known in the art for the preparation of lithium manganese iron phosphate positive electrode active material, for example, the manganese source comprises at least one of $MnCO_3$, $Mn(CH_3COO)_2$ and $MnC_2O_4$.

In some embodiments, in S2, the phosphorus source may be a phosphorus-containing compound known in the art for the preparation of lithium manganese iron phosphate positive electrode active material, for example, the phosphorus source comprises at least one of $(NH_4)_2HPO_4$, $NH_4H_2PO_4$, $(NH_4)_3PO_4$ and $H_3PO_4$.

The doping element N denotes a doping element of lithium site, and In some embodiments, optionally the doping element N comprises at least one of Zn, Al, Na, K, Mg, Nb, Mo and W. In some embodiments, optionally the source of doping element N in S2 comprises at least one of hydrochloride, nitrate, sulfate and acetate of the doping element N.

The doping element Q denotes a doping element of phosphorus site, and in some embodiments, optionally the doping element Q comprises at least one of B, S, Si and N. In some embodiments, optionally in S2, the source of doping element Q comprises at least one of sulfate, borate, nitrate and silicate of the doping element Q.

The doping element R denotes a doping element of oxygen site, and in some embodiments, optionally the doping element R comprises at least one of S, F, Cl and Br.

In some embodiments, optionally in S2, the source of doping element R comprises at least one of elementary substance and ammonium salt of the doping element R.

By selecting the sources of the above-mentioned doping elements, the uniformity of the distribution of the above-mentioned doping elements can be improved, thereby improving the electrochemical performance of the lithium manganese iron phosphate positive electrode active material.

In some embodiments, the solvent in S2 comprises ethanol, water or a mixed solvent thereof.

In some embodiments, the grinding in S2 can be carried out by means of suitable grinding methods known in the art, for example, the grinding can be carried out in a ball mill tank. Optionally, the rotational speed of the ball milling is 300 r/min~800 r/min. Optionally, the ball milling time is 3 h~24 h.

In some embodiments, the temperature of spray drying in S2 can be a temperature conventional in the art for carrying out spray drying. Optionally, the spray drying temperature is 200° C.~250° C.

In some embodiments, a carbon source is further added in S2, and mixed and ground together to obtain a carbon-coated lithium manganese iron phosphate positive electrode active material. Optionally, the carbon source comprises at least one of an organic carbon source and an inorganic carbon source, and more optionally comprises at least one of glucose, sucrose, starch, fructose, polyvinyl alcohol, polyethylene glycol and citric acid.

In some embodiments, the sintering process in S3 is carried out in a muffle furnace.

In some embodiments, the sintering process in S3 can be a step-wise sintering process. Optionally, the step-wise sintering process comprises the steps of: S31, pre-sintering the powder obtained in S2 at a low temperature of 350° C.~550° C. under an air atmosphere or a protective gas atmosphere, and obtaining a pre-sintered material after the reaction; S32, grinding the pre-sintered material obtained in S31, and then granulating by spray drying to obtain a pre-sintered material powder; and S33, sintering the pre-sintered material powder obtained in S32 at a high temperature of 650° C.~750° C. under a protective gas atmosphere to obtain the lithium manganese iron phosphate positive electrode active material.

In some embodiments, the low temperature pre-sintering time in S31 is 2 h~10 h.

In some embodiments, the high temperature sintering time in S33 is 2 h~10 h.

In some embodiments, the protective gas atmosphere in S31 may be nitrogen, an inert gas, or a combination thereof.

In some embodiments, the protective gas atmosphere in S33 may be nitrogen, an inert gas, or a combination thereof.

In some embodiments, the grinding in S32 can be carried out by means of suitable grinding methods known in the art, for example, the grinding can be carried out in a ball mill tank. Optionally, the rotational speed of the ball milling is 300 r/min~800 r/min. Optionally, the ball milling time is 3 h~24 h.

In some embodiments, the temperature of spray drying in S32 can be a temperature conventional in the art for carrying out spray drying. Optionally, the spray drying temperature is 200° C.~250° C.

In some embodiments, the preparation method further comprises the step of crushing the lithium manganese iron phosphate positive electrode active material obtained in S3 to a desired particle diameter. Optionally, the crushing is airflow crushing.

In some embodiments, the preparation method comprises the steps of: mixing and grinding an iron source, a solid base and optionally a source of doping element M for 20 min~60 min, and then standing for 30 min~120 min, to allow the components to undergo a low temperature solid phase reaction, and removing impurities by washing, and drying the obtained product to obtain a nanoscale iron-containing oxide, wherein the doping element M denotes a doping element of manganese site and iron site; mixing the obtained nanoscale iron-containing oxide with a solvent, a lithium source, a manganese source, a phosphorus source, a carbon source, optionally a source of doping element N, optionally a source of doping element Q and optionally a source of doping element R in a predetermined ratio and then grinding, and after grinding, granulating by spray drying to obtain a powder, wherein the doping element N denotes a doping element of lithium site, the doping element Q denotes a doping element of phosphorus site, and the doping element R denotes a doping element of oxygen site; pre-sintering the obtained powder at a low temperature of 350° C.~550° C. for 2 h~10 h under an air atmosphere or a protective gas atmosphere to obtain a pre-sintered material; grinding the obtained pre-sintered material, and then granulating by spray drying to obtain a pre-sintered material powder; and sintering the obtained pre-sintered material powder at a high temperature of 650° C.~750° C. for 2 h~10 h under a protective gas atmosphere to obtain the lithium manganese iron phosphate positive electrode active material.

In the preparation method of the present application, the amounts of the respective sources of the doping elements M, N, Q and R added depend on the target doping amounts; and the amounts of the iron source, lithium source, manganese source and phosphorus source added are in accordance with the stoichiometric ratio of lithium manganese iron phosphate positive electrode active material. In some embodiments, the amount of the lithium source added may be slightly excessive, for example, it may be 100%~110% of the theoretical mass of the lithium source, which refers to the mass of the lithium source calculated according to the stoichiometric ratio of lithium manganese iron phosphate positive electrode active material.

In the preparation method of the present application, if not specified, each raw material can be purchased directly, with or without crystallization water. Taking ferric chloride as an example, in the preparation method of the present application, both anhydrous ferric chloride and ferric chloride hexahydrate $FeCl_3 \cdot 6H_2O$ can be used.

Lithium Manganese Iron Phosphate Positive Electrode Active Material

A second aspect of embodiments of the present application provides a lithium manganese iron phosphate positive electrode active material obtained by the preparation method of the first aspect of embodiments of the present application.

The lithium manganese iron phosphate positive electrode active material has a chemical formula of $Li_aN_bFe_xMn_y$ $M_{1-x-y}P_{1-m}Q_mO_{4-n}R_n$, wherein the doping element M denotes a doping element of manganese site and iron site, and optionally comprises at least one of Al, Cu, Mg, Zn, Ni, Ti, V, Zr, Co, Ga, Sn, Sb, Nb and Ge; the doping element N denotes a doping element of lithium site, and optionally comprises at least one of Zn, Al, Na, K, Mg, Nb, Mo and W; the doping element Q denotes a doping element of phosphorus site, and optionally comprises at least one of B, S, Si and N; and the doping element R denotes a doping element of oxygen site, and optionally comprises at least one of S, F, Cl and Br, wherein a is 0.9 to 1.1, b is 0 to 0.1, x is 0.001 to 0.999, y is 0.001 to 0.999, 1-x-y is 0 to 0.1, m is 0 to 0.1, n is 0 to 0.1, and the lithium manganese iron phosphate positive electrode active material is electrically neutral.

Optionally, x is 0.199 to 0.50, and y is 0.499 to 0.80, so that the lithium manganese iron phosphatepositive electrode active material can have better electrochemical performance.

Optionally, x:y is 5:5~2:8, so that the lithium manganese iron phosphatepositive electrode active material can have better electrochemical performance.

Optionally, 1-x-y is 0.001 to 0.1.

Optionally, b is 0.001 to 0.1.

Optionally, m is 0.001 to 0.1.

Optionally, n is 0.001 to 0.1.

Thus, the lithium manganese iron phosphate positive electrode active material has higher structural stability, and can have better electrochemical performance.

The tap density of the lithium manganese iron phosphate positive electrode active material obtained by the above preparation method of the present application is above 1.4 $g/cm^3$, and optionally is 1.47 $g/cm^3$~1.82 $g/cm^3$. Thus, the volumetric energy density of the secondary battery can be improved.

The volume average particle diameter Dv50 of the lithium manganese iron phosphate positive electrode active material obtained by the above preparation method of the present application is 300 nm~500 nm. Thus, the electrochemical performance of the secondary battery can be improved.

The lithium manganese iron phosphate positive electrode active material obtained by the above preparation method of the present application has a spherical or spheroidal single crystal morphology. Thus, the electrochemical performance and volumetric energy density of the secondary battery can be improved.

Positive Electrode Plate

A third aspect of embodiments of the present application provides a positive electrode plate comprising a positive electrode current collector and a positive electrode film layer provided on at least one surface of the positive electrode current collector, wherein the positive electrode film layer comprises the lithium manganese iron phosphate positive electrode active material obtained by the preparation method of the first aspect of embodiments of the present application or the lithium manganese iron phosphate positive electrode active material of the second aspect of embodiments of the present application. The positive electrode current collector has two opposite surfaces in the direction of its own thickness, and the positive electrode film layer is provided on either or both of the two opposite surfaces of the positive electrode current collector.

In some embodiments, the content of the positive electrode active material in the positive electrode film layer is more than 50% by weight, optionally 90% to 99% by weight, based on the total weight of the positive electrode film layer.

The positive electrode film layer does not exclude other components in addition to the lithium manganese iron phosphate positive electrode active material obtained by the preparation method of the first aspect of the present application or the lithium manganese iron phosphate positive electrode active material of the second aspect of embodiments of the present application, for example, the positive electrode film layer may further comprise other positive electrode active materials, and optionally, the other positive electrode active materials may comprise at least one of lithium transition metal oxides and modified compounds thereof. As an example, the other positive electrode active materials may comprise at least one of lithium-cobalt oxide, lithium-nickel oxide, lithium-manganese oxide, lithium-nickel-cobalt oxide, lithium-manganese-cobalt oxide, lithium-nickel-manganese oxide, lithium-nickel-cobalt manganese oxide, lithium-nickel-cobalt-aluminum oxide, and their respective modified compounds.

In some embodiments, the positive electrode film layer further optionally comprises a positive electrode conductive agent. The present application does not particularly limit the type of the positive electrode conductive agent, and as an example, the positive electrode conductive agent comprises at least one of superconducting carbon, conductive graphite, acetylene black, carbon black, Ketjen black, carbon dot, carbon nanotube, graphene and carbon nanofiber.

In some embodiments, the positive electrode film layer further optionally comprises a positive electrode binder. The present application does not particularly limit the type of the positive electrode binder, and as an example, the positive electrode binder may comprise at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin.

In some embodiments, the positive electrode current collector can be a metal foil or a composite current collector. As an example of a metal foil, an aluminum foil can be used. A composite current collector may comprise a high molecular material substrate layer and a metal material layer formed on at least one surface of the high molecular material substrate layer. As an example, the metal material may comprise at least one of aluminum, aluminum alloy, nickel, nickel alloy, titanium, titanium alloy, silver and silver alloy. As an example, the high molecular material substrate layer may comprise at least one of polypropylene (PP), polyethylene terephthalate (PET), polybutylene terephthalate (PBT), polystyrene (PS) and polyethylene (PE).

The positive electrode film layer is usually formed by coating a positive electrode slurry on the positive electrode current collector, followed by drying and cold pressing. The positive electrode slurry is generally formed by dispersing the positive electrode active material, optionally the conductive agent, optionally the binder and any other components in a solvent and uniformly stirring. The solvent may be N-methyl pyrrolidone (NMP), but is not limited thereto.

Secondary Battery

A fourth aspect of embodiments of the present application provides a secondary battery. Secondary batteries, also known as rechargeable batteries or storage batteries, refer to batteries that, after being discharged, can activate active materials by charging for continuous use. Generally, a secondary battery comprises an electrode assembly and an electrolyte, and the electrode assembly comprises a positive electrode plate, a negative electrode plate and a separator. The separator is provided between the positive electrode plate and the negative electrode plate, and mainly functions to prevent a short circuit between the positive electrode and the negative electrode while allowing active ions to pass through. The electrolyte serves to conduct active ions between the positive electrode plate and the negative electrode plate.

[Positive Electrode Plate]

The positive electrode plate used in the secondary battery of the present application is the positive electrode plate described in any example of the third aspect of embodiments of the present application.

[Negative Electrode Plate]

In some embodiments, the negative electrode plate comprises a negative electrode current collector and a negative electrode film layer provided on at least one surface of the negative electrode current collector and comprising a negative electrode active material. For example, the negative electrode current collector has two opposite surfaces in the direction of its own thickness, and the negative electrode film layer is provided on either or both of the two opposite surfaces of the negative electrode current collector.

The negative electrode active material may use a negative electrode active material known in the art for use in secondary batteries. As an example, the negative electrode active material comprises but is not limited to at least one of natural graphite, artificial graphite, soft carbon, hard carbon, silicon-based material, tin-based material and lithium titanate. The silicon-based material may comprise at least one of elemental silicon, silicon oxide, silicon-carbon composite, silicon-nitrogen composite and silicon alloy material. The tin-based material may comprise at least one of elemental tin, tin oxide and tin alloy material. The present application is not limited to these materials, and other conventionally known materials that can be used as negative electrode active materials for secondary batteries can also be used. It is possible to use only one of these negative electrode active materials alone, or to use more than two in combination.

In some embodiments, the negative electrode film layer further optionally comprises a negative electrode conductive agent. The present application does not particularly limit the type of the negative electrode conductive agent, and as an example, the negative electrode conductive agent may comprise at least one of superconducting carbon, conductive graphite, acetylene black, carbon black, Ketjen black, carbon dot, carbon nanotube, graphene and carbon nanofiber.

In some embodiments, the negative electrode film layer further optionally comprises a negative electrode binder. The present application does not particularly limit the type of the negative electrode binder, and as an example, the negative electrode binder may comprise at least one of styrene-butadiene rubber (SBR), water-soluble unsaturated resin SR-1B, aqueous acrylic resin (for example, polyacrylic acid PAA, polymethacrylic acid PMAA, sodium polyacrylate PAAS), polyacrylamide (PAM), polyvinyl alcohol (PVA), sodium alginate (SA), and carboxymethyl chitosan (CMCS).

In some embodiments, the negative electrode film layer further optionally comprises other auxiliary agents. As an example, the other auxiliary agents may comprise thickeners such as sodium carboxymethyl cellulose (CMC), PTC thermistor materials, and the like.

In some embodiments, the negative electrode current collector can be a metal foil or a composite current collector. As an example of a metal foil, a copper foil can be used. A composite current collector may comprise a high molecular material substrate layer and a metal material layer formed on at least one surface of the high molecular material substrate layer. As an example, the metal material may comprise at least one of copper, copper alloy, nickel, nickel alloy, titanium, titanium alloy, silver and silver alloy. As an example, the high molecular material substrate layer may comprise at least one of polypropylene (PP), polyethylene terephthalate (PET), polybutylene terephthalate (PBT), polystyrene (PS) and polyethylene (PE).

The negative electrode film layer is usually formed by coating a negative electrode slurry on the negative electrode current collector, followed by drying and cold pressing. The negative electrode slurry is generally formed by dispersing the negative electrode active material, optionally the conductive agent, optionally the binder, optionally the other auxiliary agents in a solvent and uniformly stirring. The solvent may be N-methyl pyrrolidone (NMP) or deionized water, but is not limited thereto.

The negative electrode plate does not exclude other additional functional layers in addition to the negative electrode film layer. For example, in some embodiments, the negative electrode plate described in the present application further comprises a conductive undercoat layer (e.g., composed of a conductive agent and a binder) sandwiched between the negative electrode current collector and the negative electrode film layer and provided on the surface of the negative electrode current collector. In some other embodiments, the negative electrode plate described in the present application further comprises a protective layer covering the surface of the negative electrode film layer.

[Electrolyte]

The type of the electrolyte is not particularly limited in the present application, and may be selected according to actual needs. For example, the electrolyte may be selected from at least one of a solid electrolyte and a liquid electrolyte (i.e., electrolyte solution).

In some embodiments, the electrolyte is an electrolyte solution, and the electrolyte solution comprises an electrolyte salt and a solvent.

The type of the electrolyte salt is not particularly limited, and may be selected according to actual needs. In some embodiments, as an example, the electrolyte salt may comprise at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro bis(oxalato)phosphate (LiDFOP), and lithium tetrafluoro(oxalato)phosphate (LiTFOP).

The type of the solvent is not particularly limited, and may be selected according to actual needs. In some embodiments, as an example, the solvent may comprise at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), methyl ethyl sulfone (EMS) and ethylsulfonylethane (ESE).

In some embodiments, the electrolyte solution further optionally comprises an additive. For example, the additive may comprise a negative electrode film-forming additive, or may comprise a positive electrode film-forming additive, and may further comprise an additive capable of improving certain performances of the battery, such as an additive for improving the overcharging performance of the battery, an additive for improving the high temperature performance of the battery, and an additive for improving the low temperature power performance of the battery.

[Separator]

The secondary battery using an electrolyte solution and some secondary batteries using a solid electrolyte further comprise a separator. The separator is provided between the positive electrode plate and the negative electrode plate, and mainly functions to prevent a short circuit between the positive electrode and the negative electrode while allowing active ions to pass through. The type of the separator is not particularly limited in the present application, and any well-known separator with a porous structure having good chemical stability and mechanical stability may be selected.

In some embodiments, the material of the separator may comprise at least one of glass fiber, non-woven cloth, polyethylene, polypropylene, and polyvinylidene fluoride. The separator may be a single-layer film or a multi-layer composite film. When the separator is a multi-layer composite film, the materials of the layers are the same or different.

In some embodiments, the positive electrode plate, the separator and the negative electrode plate can be made into an electrode assembly by a winding process and/or a stacking process.

In some embodiments, the secondary battery may comprise an outer package. The outer package can be used to encapsulate the above-mentioned electrode assembly and electrolyte.

In some embodiments, the outer package of the secondary battery may be a hard shell, e.g., a hard plastic shell, an aluminum shell, a steel shell, etc. The outer package of the secondary battery may also be a soft pack, such as a bag-type soft pack. The material of the soft pack may be a plastic, such as at least one of polypropylene (PP), polybutylene terephthalate (PBT) and polybutylene succinate (PBS).

The present application has no particular limitation on the shape of the secondary battery, which can be cylindrical, square or any other shapes. For example, FIG. 1 shows a secondary battery 5 with a square structure as an example.

Figure 2:
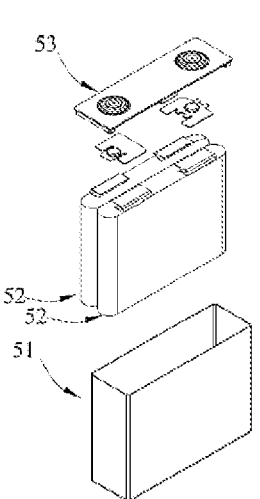
FIG. 2 is an exploded schematic view of an embodiment of the secondary battery of FIG. 1.

In some embodiments, as shown in FIG. 2, the outer package may comprise a case 51 and a cover plate 53. The case 51 may comprise a bottom plate and a side plate connected to the bottom plate, with the bottom plate and the side plate enclosing to form an accommodating cavity. The case 51 has an opening that communicates with the accommodating cavity, and the cover plate 53 is used to cover the opening to close the accommodating cavity. The positive electrode plate, the negative electrode plate, and the separator may be formed into an electrode assembly 52 by a winding process and/or a stacking process. The electrode assembly 52 is encapsulated within the accommodating cavity. The electrolyte solution impregnates the electrode assembly 52. The number of electrode assemblies 52 contained in the secondary battery 5 can be one or more, and can be adjusted according to actual needs.

The preparation method of the secondary battery of the present application is well known. In some embodiments, a positive electrode plate, a separator, a negative electrode plate and an electrolyte solution can be assembled to form a secondary battery. As an example, the positive electrode plate, the separator and the negative electrode plate can be wound or stacked to form an electrode assembly, and the electrode assembly is placed in an outer package, oven dried and then injected with the electrolyte solution, and the secondary battery is obtained through vacuum encapsulation, standing, formation, shaping and other procedures.

In some embodiments of the present application, the secondary batteries according to the present application can be assembled into a battery module, the number of the secondary batteries contained in the battery module may be a plurality, and the specific number can be adjusted according to the application and capacity of the battery module.

Figure 3:
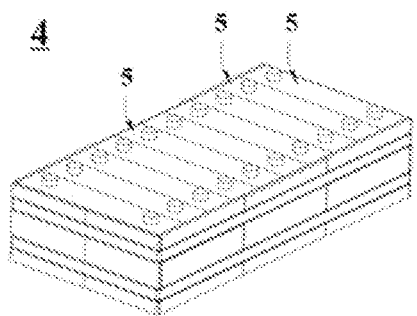
FIG. 3 is a schematic view of an embodiment of a battery module of the present application.

FIG. 3 is a schematic view of a battery module 4 as an example. As shown in FIG. 3, in the battery module 4, a plurality of secondary batteries 5 can be arranged in sequence along the length direction of the battery module 4. Of course, they can also be arranged in any other way. The plurality of secondary batteries 5 may further be fixed by fasteners.

Optionally, the battery module 4 may further comprise a case having an accommodating space, in which the plurality of secondary batteries 5 are accommodated.

In some embodiments, the above-mentioned battery modules can further be assembled into a battery pack, and the number of the battery modules included in the battery pack can be adjusted according to the application and capacity of the battery pack.

Figure 4:
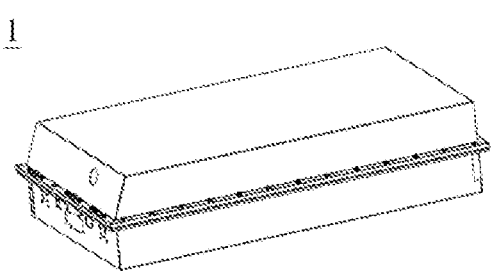
FIG. 4 is a schematic view of an embodiment of a battery pack of the present application.
Figure 5:
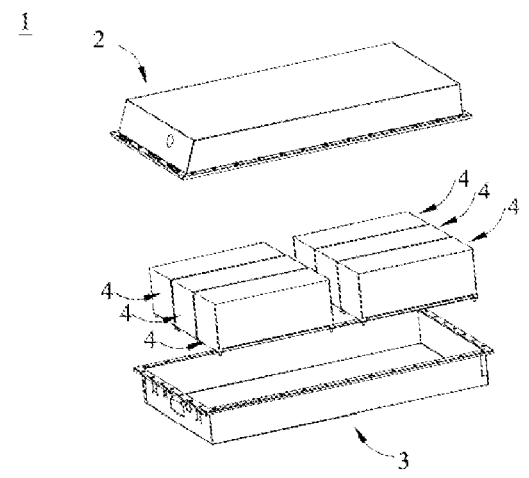
FIG. 5 is an exploded schematic view of an embodiment of the battery pack shown in FIG. 4.

FIGS. 4 and 5 are schematic views of a battery pack 1 as an example. As shown in FIGS. 4 and 5, the battery pack 1 may comprise a battery box and a plurality of battery modules 4 provided in the battery box. The battery box comprises an upper box body 2 and a lower box body 3, wherein the upper box body 2 is used to cover the lower box body 3 to form an enclosed space for accommodating the battery modules 4. The plurality of battery modules 4 may be arranged in the battery box in any manner.

Electrical Apparatus

A fifth aspect of embodiments of the present application provides an electrical apparatus comprising at least one of the secondary battery, battery module or battery pack of the present application. The secondary battery, battery module, or battery pack may be used as a power source for the electrical apparatus, and may also be used as an energy storage unit for the electrical apparatus. The electrical apparatus may be, but is not limited to, a mobile device (such as a mobile phone, a laptop), an electric vehicle (such as an all-electric vehicle, a hybrid electric vehicle, a plug-in hybrid electric vehicle, an electric bicycle, an electric scooter, an electric golf cart, an electric truck), an electric train, a ship, a satellite, an energy storage system, etc.

For the electrical apparatus, the secondary battery, the battery module, or the battery pack can be selected according to the use requirements of the electrical apparatus.

Figure 6:
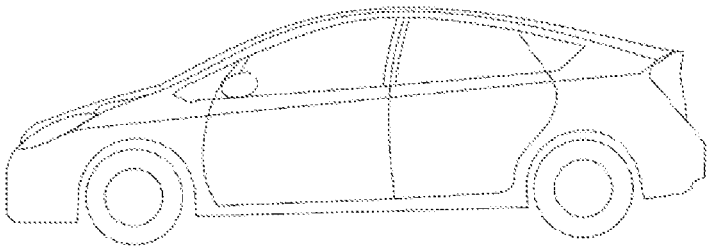
FIG. 6 is a schematic view of an embodiment of an electrical apparatus comprising the secondary battery of the present application as a power source.

FIG. 6 is a schematic view of an electrical apparatus as an example. The electrical apparatus is a all-electric vehicle, a hybrid electric vehicle or a plug-in hybrid electric vehicle, and the like. In order to meet the requirements of the electrical apparatus for high power and high energy density, a battery pack or a battery module may be used.

As another example, the electrical apparatus may be a mobile phone, a tablet, a laptop, etc. The electrical apparatus is generally required to be light and thin, and can use a secondary battery as a power source.

EXAMPLES

The following examples describe the disclosure of the present application more specifically, and these examples are for illustrative purposes only, as various modifications and changes within the scope of the disclosure of the present application will be apparent to those skilled in the art. Unless otherwise stated, all parts, percentages, and ratios reported in the following examples are based on weight, all reagents used in the examples are either commercially available or synthesized according to conventional methods, and can be directly used without further processing, and all the instruments used in the examples are commercially available.

Example 1

$FeCl_3 \cdot 6H_2O$ (38 mmol), $MgCl_2 \cdot 6H_2O$ (2 mmol) and NaOH (60 mmol) were added into a mortar and ground for 60 min respectively to fine the particles; and then NaOH was added to $FeCl_3 \cdot 6H_2$) and $MgCl_2 \cdot 6H_2O$ to continue mixing and grinding for 30 min to obtain a powdery precursor, and then it was allowed to stand for 60 min to ensure that the reaction was completed; and the obtained powder was washed with water and ethanol for 3 times each, and then dried in a vacuum drying oven at 80° C. for 12 h to obtain a nanoscale iron-containing oxide.

The obtained nanoscale iron-containing oxide (20 mmol), $Li_2CO_3$ (50 mmol), $MnC_2O_4$ (60 mmol), $NH_4H_2PO_4$ (100 mmol) and sucrose (15 mmol) were placed in a ball milling tank, a small amount of ethanol and water were added as solvents, and a slurry was obtained by ball milling at a rotational speed of 500 r/min for 8 h; and the obtained slurry was transferred to a spray drying device for granulation by spray drying to obtain a powder, with the drying temperature being set at 210° C.

The obtained powder was placed in a muffle furnace and sintered at 400° C. under an air atmosphere for 5 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 800 r/min for 4 h; the obtained slurry was transferred to a spray drying device for granulation by spray drying to obtain a pre-sintered material powder, with the drying temperature being set at 210° C.; and the obtained pre-sintered material powder was placed in a muffle furnace and sintered at 700° C. under a nitrogen atmosphere for 10 h, cooled naturally to room temperature, and a final product was obtained by airflow crushing, that is, a nanoscale lithium manganese iron phosphate positive electrode active material $LiFe_{0.38}Mn_{0.60}Mg_{0.02}PO_4$. The content of each element can be detected by inductively coupled plasma emission spectrometry (ICP).

Example 2

$Fe(NO_3)_3 \cdot 9H_2O$ (39.5 mmol), $CoSO_{4.7}H_2O$ (0.5 mmol) and NaOH (120 mmol) were added into a mortar and ground for 60 min respectively to fine the particles; and then NaOH was added to $Fe(NO_3)_3 \cdot 9H_2O$ and $CoSO_4 \cdot 7H_2O$ to continue mixing and grinding for 30 min to obtain a powdery precursor, and then it was allowed to stand for 120 min to ensure that the reaction was completed; and the obtained powder was washed with water and ethanol for 3 times each, and then dried in a vacuum drying oven at 80° C. for 12 h to obtain a nanoscale iron-containing oxide.

The obtained nanoscale iron-containing oxide (20 mmol), $LiOH \cdot H_2O$ (105 mmol), $MnCO_3$ (60 mmol), $(NH_4)_2HPO_4$ (100 mmol) and glucose (15 mmol) were placed in a ball milling tank, a small amount of ethanol and water were added as solvents, and a slurry was obtained by ball milling at a rotational speed of 600 r/min for 8 h; and the obtained slurry was transferred to a spray drying device for granulation by spray drying to obtain a powder, with the drying temperature being set at 210° C.

The obtained powder was placed in a muffle furnace and sintered at 450° C. under a nitrogen atmosphere for 10 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 800 r/min for 12 h; the obtained slurry was transferred to a spray drying device for granulation by spray drying to obtain a pre-sintered material powder, with the drying temperature being set at 210° C.; and the obtained pre-sintered material powder was placed in a muffle furnace and sintered at 650° C. under a nitrogen atmosphere for 6 h, cooled naturally to room temperature, and a final product was obtained by airflow crushing, that is, a nanoscale lithium manganese iron phosphate positive electrode active material $LiFe_{0.395}Mn_{0.60}Co_{0.005}PO_4$. The content of each element can be detected by inductively coupled plasma emission spectrometry (ICP).

Example 3

$FeCl_3 \cdot 6H_2O$ (39 mmol), $CoCl_2 \cdot 6H_2O$ (1 mmol) and NaOH (80 mmol) were added into a mortar and ground for 60 min respectively to fine the particles; and then NaOH was added to $FeCl_3 \cdot 6H_2O$ and $CoCl_2 \cdot 6H_2O$ to continue mixing and grinding for 30 min to obtain a powdery precursor, and then it was allowed to stand for 120 min to ensure that the reaction was completed; and the obtained powder was washed with water and ethanol for 3 times each, and then dried in a vacuum drying oven at 80° C. for 12 h to obtain a nanoscale iron-containing oxide.

The obtained nanoscale iron-containing oxide (20 mmol), $LiOH \cdot H_2O$ (105 mmol), $MnCO_3$ (60 mmol), $(NH_4)_2HPO_4$ (100 mmol) and glucose (15 mmol) were placed in a ball milling tank, a small amount of ethanol and water were added as solvents, and a slurry was obtained by ball milling at a rotational speed of 600 r/min for 8 h; and the obtained slurry was transferred to a spray drying device for granulation by spray drying to obtain a powder, with the drying temperature being set at 210° C.

The obtained powder was placed in a muffle furnace and sintered at 450° C. under a nitrogen atmosphere for 10 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 800 r/min for 12 h; the obtained slurry was transferred to a spray drying device for granulation by spray drying to obtain a pre-sintered material powder, with the drying temperature being set at 210° C.; and the obtained pre-sintered material powder was placed in a muffle furnace and sintered at 650° C. under a nitrogen atmosphere for 6 h, cooled naturally to room temperature, and a final product was obtained by airflow crushing, that is, a nanoscale lithium manganese iron phosphate positive electrode active material $LiFe_{0.39}Mn_{0.60}Co_{0.01}PO_4$. The content of each element can be detected by inductively coupled plasma emission spectrometry (ICP).

Example 4

$FeCl_3·6H_2O$ (39.9 mmol), $ZnCl_2$ (0.1 mmol) and NaOH (70 mmol) were added into a mortar and ground for 60 min respectively to fine the particles; and then NaOH was added to $FeCl_3·6H_2O$ and $ZnCl_2$ to continue mixing and grinding for 30 min to obtain a powdery precursor, and then it was allowed to stand for 60 min to ensure that the reaction was completed; and the obtained powder was washed with water and ethanol for 3 times each, and then dried in a vacuum drying oven at 80° C. for 12 h to obtain a nanoscale iron-containing oxide.

The obtained nanoscale iron-containing oxide (20 mmol), $Li_2CO_3$ (51 mmol), $MnC_2O_4$ (60 mmol), $NH_4H_2PO_4$ (100 mmol) and sucrose (15 mmol) were placed in a ball milling tank, a small amount of ethanol and water were added as solvents, and a slurry was obtained by ball milling at a rotational speed of 600 r/min for 6 h; and the obtained slurry was transferred to a spray drying device for granulation by spray drying to obtain a powder, with the drying temperature being set at 210° C.

The obtained powder was placed in a muffle furnace and sintered at 400° C. under an air atmosphere for 5 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 500 r/min for 4 h; the obtained slurry was transferred to a spray drying device for spray drying to obtain a pre-sintered material powder, with the drying temperature being set at 210° C.; and the obtained pre-sintered material powder was placed in a muffle furnace and sintered at 700° C. under a nitrogen atmosphere for 10 h, cooled naturally to room temperature, and a final product was obtained by airflow crushing, that is, a nanoscale lithium manganese iron phosphate positive electrode active material $LiFe_{0.399}Mn_{0.60}Zn_{0.001}PO_4$. The content of each element can be detected by inductively coupled plasma emission spectrometry (ICP).

Example 5

$FeCl_3·6H_2O$ (40 mmol) and NaOH (60 mmol) were added into a mortar and ground for min respectively to fine the particles; and then NaOH was added to $FeCl_3·6H_2O$ to continue mixing and grinding for 30 min to obtain a powdery precursor, and then it was allowed to stand for 60 min to ensure that the reaction was completed; and the obtained powder was washed with water and ethanol for 3 times each, and then dried in a vacuum drying oven at 80° C. for 12 h to obtain nanoscale ferric oxide.

The obtained nanoscale ferric oxide (20 mmol), $Li_2CO_3$ (50 mmol), $MnC_2O_4$ (60 mmol), $NH_4H_2PO_4$ (100 mmol) and sucrose (15 mmol) were placed in a ball milling tank, a small amount of ethanol and water were added as solvents, and a slurry was obtained by ball milling at a rotational speed of 500 r/min for 8 h; and the obtained slurry was transferred to a spray drying device for granulation by spray drying to obtain a powder, with the drying temperature being set at 210° C.

The obtained powder was placed in a muffle furnace and sintered at 400° C. under an air atmosphere for 5 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 800 r/min for 4 h; the obtained slurry was transferred to a spray drying device for granulation by spray drying to obtain a pre-sintered material powder, with the drying temperature being set at 210° C.; and the obtained pre-sintered material powder was placed in a muffle furnace and sintered at 700° C. under a nitrogen atmosphere for 10 h, cooled naturally to room temperature, and a final product was obtained by airflow crushing, that is, a nanoscale lithium manganese iron phosphate positive electrode active material $LiFe_{0.40}Mn_{0.60}PO_4$. The content of each element can be detected by inductively coupled plasma emission spectrometry (ICP).

Comparative Example 1

$FeC_2O_4$ (40 mmol), $Li_2CO_3$ (50 mmol), $MnC_2O_4$ (60 mmol), $NH_4H_2PO_4$ (100 mmol) and sucrose (15 mmol) were placed in a ball milling tank, a small amount of ethanol and water were added as solvents, and a slurry was obtained by ball milling at a rotational speed of 500 r/min for 8 h; and the obtained slurry was transferred to a spray drying device for granulation by spray drying to obtain a powder, with the drying temperature being set at 210° C.

The obtained powder was placed in a muffle furnace and sintered at 400° C. under an air atmosphere for 5 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 800 r/min for 4 h; the obtained slurry was transferred to a spray drying device for granulation by spray drying to obtain a pre-sintered material powder, with the drying temperature being set at 210° C.; and the obtained pre-sintered material powder was placed in a muffle furnace and sintered at 700° C. under a nitrogen atmosphere for 10 h, cooled naturally to room temperature, and a final product was obtained by airflow crushing, that is, a lithium manganese iron phosphate positive electrode active material $LiFe_{0.40}Mn_{0.60}PO_4$. The content of each element can be detected by inductively coupled plasma emission spectrometry (ICP).

Comparative Example 2

AR-grade micron particles $Fe_2O_3$ (20 mmol, Dv50 was about 10 μm, purchased from Sinopharm Chemical Reagent Co., Ltd), $Li_2CO_3$ (50 mmol), $MnC_2O_4$ (60 mmol), $NH_4H_2PO_4$ (100 mmol) and sucrose (15 mmol) were placed in a ball milling tank, a small amount of ethanol and water were added as solvents, and a slurry was obtained by ball milling at a rotational speed of 500 r/min for 8 h; and the obtained slurry was transferred to a spray drying device for granulation by spray drying to obtain a powder, with the drying temperature being set at 210° C.

The obtained powder was placed in a muffle furnace and sintered at 400° C. under an air atmosphere for 5 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 800 r/min for 4 h; the obtained slurry was transferred to a spray drying device for granulation by spray drying to obtain a pre-sintered material powder, with the drying temperature being set at 210° C.; and the obtained pre-sintered material powder was placed in a muffle furnace and sintered at 700° C. under a nitrogen atmosphere for 10 h, cooled naturally to room temperature, and a final product was obtained by airflow crushing, that is, a lithium manganese iron phosphate positive electrode active material $LiFe_{0.40}Mn_{0.60}PO_4$. The content of each element can be detected by inductively coupled plasma emission spectrometry (ICP).

Comparative Example 3

The micron particles $Fe_2O_3$ used in Comparative Example 2 were crushed to nanoscale size by high speed ball milling, and then placed with $Li_2CO_3$ (50 mmol), $MnC_2O_4$ (60 mmol), $MgCl_2 \cdot 6H_2O$ (2 mmol), $NH_4H_2PO_4$ (100 mmol) and sucrose (15 mmol) in a ball milling tank, a small amount of ethanol and water were added as solvents, and a slurry was obtained by ball milling at a rotational speed of 500 r/min for 8 h; and the obtained slurry was transferred to a spray drying device for granulation by spray drying to obtain a powder, with the drying temperature being set at 210° C.

The obtained powder was placed in a muffle furnace and sintered at 400° C. under an air atmosphere for 5 h, and cooled naturally to room temperature to obtain a pre-sintered material; the obtained pre-sintered material was placed in a ball milling tank, a small amount of ethanol and water were added as solvents, and a slurry was obtained by ball milling at a rotational speed of 800 r/min for 4 h; the obtained slurry was transferred to a spray drying device for granulation by spray drying to obtain a pre-sintered material powder, with the drying temperature being set at 210° C.; and the obtained pre-sintered material powder was placed in a muffle furnace ume distribution percentage of the material reaches 50%. In the present application, a Malvern Master Size 3000 type laser particle size analyzer was used to test the volume average particle diameter Dv50 of the lithium manganese iron phosphate positive electrode active material prepared above. For the test basis, reference can be made to GB/T 19077-2016.

(2) Test of Tap Density

The tap density of the lithium manganese iron phosphate positive electrode active material prepared above was tested using a BT-301 powder tap density tester from Bettersize Instruments, Dandong. For the test basis, reference can be made to GB/T 5162-2006.

(3) Test of Initial Gram Capacity of Button Battery

The lithium manganese iron phosphate positive electrode active material prepared above, a binder polyvinylidene fluoride (PVDF) and a conductive agent acetylene black were added to N-methyl pyrrolidone (NMP) in a weight ratio of 90:5:5, and stirred in a drying chamber to prepare a slurry. The above slurry was coated on an aluminum foil, dried, and cold-pressed into a positive electrode plate. The coating amount was 10 mg/cm², and the tap density was 2.0 g/cm³.

A lithium sheet was used as the negative electrode, and a solution of 1 mol/L $LiPF_6$ in ethylene carbonate (EC), diethyl carbonate (DEC) and dimethyl carbonate (DMC) in a volume ratio of 1:1:1 was used as an electrolyte solution, and together with the above-prepared positive electrode plate, they were assembled into a button battery in a button battery box.

In a constant temperature environment of 25° C., the button battery was charged to 4.3 V at a constant current of 0.1 C, and then charged at a constant voltage of 4.3 V until the current was less than or equal to 0.05 mA, and stood for 5 min, and then discharged at a constant current of 0.1 C to 2.0 V, and the discharge capacity obtained at this time was the initial gram capacity of the button battery.

TABLE 1

| No. | Molecular formula of lithium manganese iron phosphate positive electrode active material | Volume average particle diameter Dv50 (nm) | Tap density (g/cm³) | Initial gram capacity of button battery (mAh/g) |
|---|---|---|---|---|
| Example 1 | $LiFe_{0.38}Mn_{0.60}Mg_{0.02}PO_4$ | 420 | 1.82 | 150 |
| Example 2 | $LiFe_{0.395}Mn_{0.60}Co_{0.005}PO_4$ | 310 | 1.47 | 142 |
| Example 3 | $LiFe_{0.39}Mn_{0.60}Co_{0.01}PO_4$ | 330 | 1.53 | 152 |
| Example 4 | $LiFe_{0.399}Mn_{0.60}Zn_{0.001}PO_4$ | 480 | 1.60 | 155 |
| Example 5 | $LiFe_{0.40}Mn_{0.60}PO_4$ | 425 | 1.76 | 138 |
| Comparative Example 1 | $LiFe_{0.40}Mn_{0.60}PO_4$ | 850 | 0.85 | 120 |
| Comparative Example 2 | $LiFe_{0.40}Mn_{0.60}PO_4$ | 1100 | 1.51 | 80 |
| Comparative Example 3 | $LiFe_{0.38}Mn_{0.60}Mg_{0.02}PO_4$ | 440 | 1.33 | 106 | and sintered at 700° C. under a nitrogen atmosphere for 10 h, cooled naturally to room temperature, and a final product was obtained by airflow crushing, that is, a nanoscale lithium manganese iron phosphate positive electrode active material $LiFe_{0.38}Mn_{0.60}Mg_{0.02}O_4$. The content of each element can be detected by inductively coupled plasma emission spectrometry (ICP).

Test Section (1) Test of Volume Average Particle Diameter Dv50

Figure 7:
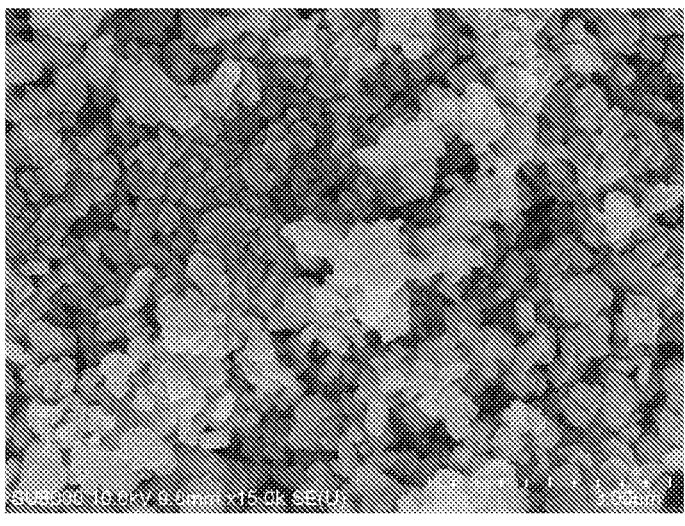
FIG. 7 is a scanning electron micrograph of a nanoscale iron-containing oxide prepared in Example 1.
Figure 8:
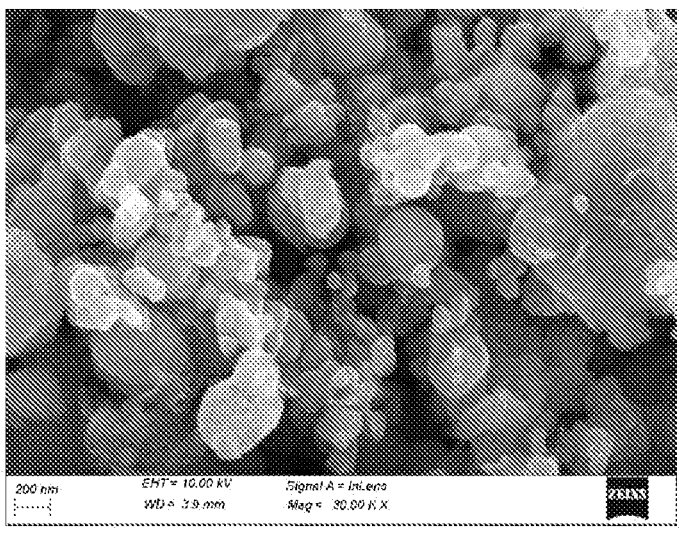
FIG. 8 is a scanning electron micrograph of a nanoscale lithium manganese iron phosphate positive electrode active material prepared in Example 1.

The volume average particle diameter Dv50 refers to the corresponding particle diameter when the cumulative vol- FIG. 7 is a scanning electron micrograph (SEM) of the nanoscale iron-containing oxide prepared in Example 1. and FIG. 8 is a scanning electron micrograph (SEM) of the nanoscale lithium manganese iron phosphate positive electrode active material prepared in Example 1. As can be seen from FIG. 7, an iron-containing oxide with a regular morphology and a particle size of nanoscale was prepared by a low temperature solid phase reaction method in the present application. As can be seen from FIG. 8, when preparing lithium manganese iron phosphate positive electrode active material in the present application, the use of a nanoscale iron-containing oxide as a raw material can obtain a lithium manganese iron phosphate positive electrode active material with a regular morphology and a particle size of nanoscale. Based on the test results of Examples 1-5, it can also be seen that a nanoscale lithium manganese iron phosphate positive electrode active material having both high initial gram capacity and high tap density can also be obtained by the preparation method of the present application.

In Comparative Examples 1 and 2, ferrous oxalate and micron-sized ferric oxide were used respectively as the raw materials, and the lithium manganese iron phosphate positive electrode active materials were prepared by traditional high temperature solid phase sintering method; however, it was difficult to obtain a lithium manganese iron phosphate positive electrode active material having both high initial gram capacity and high tap density.

In Comparative Example 3, the nanoscale ferric oxide obtained after high-speed ball milling in Comparative Example 2 was used as a raw material to prepare lithium manganese iron phosphate positive electrode active material; however, the tap density of the obtained lithium manganese iron phosphate positive electrode active material was low; and at the same time, as the doping element Mg was introduced in the spray drying granulation and sintering processes, it was difficult to realize the uniform distribution of the doping element Mg, iron element, manganese element and lithium element, etc. Therefore, as compared with Example 1, the initial gram capacity of the lithium manganese iron phosphate positive electrode active material prepared in Comparative Example 3 was also significantly reduced.

It should be noted that the present application is not limited to the embodiments above. The above-described embodiments are merely examples, and embodiments having substantively the same composition as the technical idea and exerting the same effects within the scope of the technical solution of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A preparation method for a manganese iron lithium phosphate cathode active material comprises the following steps:

S1, preparing a nano-sized iron oxide by low-temperature solid-phase reaction: mix an iron source, a solid base and a doping element M source (if any) for 20 min to 60 min to cause a low-temperature solid phase reaction among the components; after a mixing and grinding, let it stand to ensure the complete low-temperature solid-phase reaction; wash and remove impurities from the obtained product and dry it at a temperature below 100° C. to obtain nano-sized iron oxide, where the doping element M represents the doping element at the manganese and iron sites;

S2, spray drying granulation:
mix the nano-sized iron oxide in S1 with a solvent, a lithium source, a manganese source, a phosphorus source, a doping element N source (if any), a doping element Q source (if any), and a doping element R source (if any) in a predetermined portion and grind them; after the grinding is completed, spray dry and granulate to obtain powder, wherein the doping element N represents the doping element at the lithium site, the doping element Q represents the doping element at the phosphorus site, and the doping element R represents the doping element at the oxygen site;

S3, sintering, which includes the steps:

S31, pre-sintering the powder obtained in S2 at 350° C. to 550° C. in an air atmosphere or a protective gas atmosphere, and after the reaction, obtain the pre-sintered material;

S32, grinding the pre-sintered material obtained in S31 and spray dry granulate to obtain pre-sintered material powder;

S33, sintering the pre-sintered material powder obtained in S32 at 650° C. to 750° C. in a protective gas atmosphere to obtain the phosphorus manganese iron lithium phosphate cathode active material, where the molar ratio of the iron source to the solid base is 1:(1-3), the washing and impurity removal process includes water washing and alcohol washing, the solvent includes ethanol, water or their mixed solvents.

2. The preparation method as claimed in claim 1, wherein in S1, the drying is vacuum drying;

the drying time is 2 h to 15 h.

3. The preparation method as claimed in claim 1, wherein in S1, the mixing and grinding is carried out in a mortar or ball mill container, the grinding speed of the mortar is 100 r/min;

the rotation speed of the ball mill is 300 r/min to 800 r/min.

4. The preparation method as claimed in claim 1, wherein in S1, the standing time is 30 min to 120 min.

5. The preparation method as claimed in claim 1, wherein in S1, a surface active agent is added together with the iron source, the solid base and the doping element M source for mixing and grinding, the surface active agent includes polyethylene glycol;

the addition amount of the surface active agent is less than 5% by weight based on the total weight of the iron source, the solid base and the doping element M source.

6. The preparation method as claimed in claim 1, wherein in S1, before the mixing and grinding of the iron source, the solid base and the doping element M source to cause the components to undergo a low-temperature solid-phase reaction, there is a step: grinding the iron source, the solid base and the doping element M source separately, the grinding time of the iron source is 30 min to 90 min;

the grinding time of the solid base is 30 min to 90 min;

the grinding time of the doping element M source is 30 min to 90 min.

7. The preparation method as claimed in claim 1, wherein in S1, the iron source is a trivalent iron salt;

the solid base includes sodium hydroxide, potassium hydroxide, sodium carbonate and potassium carbonate among other; the source of the dopant element M includes at least one of the hydrochlorate, nitrate, sulfate and acetate of the dopant element M.

8. The preparation method as claimed in claim 1, wherein in S2, the grinding is carried out in a ball mill container, the ball mill speed is 300 r/min to 800 r/min, and the grinding time is 3 h to 24 h;

the spray drying temperature is 200° C. to 250° C.

9. The preparation method as claimed in claim 1, wherein in S2, the lithium source includes at least one of Li2CO3, LiOH, Li3PO4 and LiH2PO4;

the manganese source includes at least one of MnCO3, Mn(CH3COO)2 and MnC2O4;

the phosphorus source includes at least one of (NH4) 2HPO4, NH4H2PO4, (NH4)3PO4 and H3PO4;

the dopant element N's source includes at least one of the hydrochlorate, nitrate, sulfate and acetate of the dopant element N;

the dopant element Q's source includes at least one of the sulfate, borate, nitrate and silicate of the dopant element Q;

the dopant element R's source includes at least one of the elemental form and ammonium salt of the dopant element R.

10. The preparation method as claimed in claim 1, wherein in S2, a carbon source is also added for mixed grinding, and the carbon source includes at least one of organic carbon source and inorganic carbon source.

11. The preparation method as claimed in claim 1, wherein, in S31, the low-temperature pre-sintering time is 2 h to 10 h;

in S33, the high-temperature sintering time is 2 h to 10 h.

12. The preparation method as claimed in claim 1, in step S32, the grinding is carried out in a ball mill, with the ball mill rotation speed ranging from 300 r/min to 800 r/min, and the grinding time being from 3 h to 24 h.

13. The preparation method as claimed in claim 1, the following step in also included:

the obtained manganese iron lithium phosphate positive electrode active material in step S3 is crushed to the desired particle size, and the crushing is carried out by air jet crushing.

14. The preparation method as claimed in claim 1, the positive electrode active material of the lithium manganese iron phosphate has the chemical formula $Li_aN_bFe_xMn_yM_{1-x-y}P_{1-m}Q_mO_4-nR_n$; the doping element M represents the doping element at the manganese and iron sites, the doping element N represents the doping element at the lithium site, the doping element Q represents the doping element at the phosphorus site, and the doping element R represents the doping element at the oxygen site; the value of a is from 0.9 to 1.1, the value of b is from 0 to 0.1, the value of x is from 0.001 to 0,999, the value of y is from 0.001 to 0.999, the value of 1-x-y is from 0 to 0.1, the value of m is from 0 to 0.1, and the value of n is from 0 to 0.1; the positive electrode active material of the lithium manganese iron phosphate is electrically neutral and the bulk density of the positive electrode active material of the lithium manganese iron phosphate is above 1.4 $g/cm^3$.

15. The preparation method as claimed in claim 14, wherein, the volume average particle size Dv50 of the positive electrode active material of the lithium manganese iron phosphate is 300 nm to 500 nm;

the positive electrode active material of the lithium manganese iron phosphate has a spherical or quasi-spherical single crystal morphology.

* * * * *